United States Patent
Kohno et al.

(10) Patent No.: US 6,495,291 B1
(45) Date of Patent: Dec. 17, 2002

(54) NONAQUEOUS ELECTROLYTE SECONDARY BATTERY

(75) Inventors: Tatsuoki Kohno, Tokyo (JP); Norio Takami, Yokohama (JP); Hiroki Inagaki, Yokohama (JP); Tomokazu Morita, Funabashi (JP); Shirou Takeno, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 85 days.

(21) Appl. No.: 09/634,641

(22) Filed: Aug. 8, 2000

(30) Foreign Application Priority Data

Aug. 9, 1999 (JP) .............................. 11-225489
Dec. 28, 1999 (JP) .............................. 11-374989

(51) Int. Cl.[7] .......................... H01M 4/58; C01B 31/00
(52) U.S. Cl. ................................. 429/231.8; 423/445 R
(58) Field of Search ...................... 429/231.8; 423/275, 423/414, 445 R

(56) References Cited

U.S. PATENT DOCUMENTS

| | | | |
|---|---|---|---|
| 4,613,552 A | | 9/1986 | Ruben |
| 5,541,022 A | | 7/1996 | Mizumoto et al. |
| 5,558,954 A | * | 9/1996 | Morrison ................. 429/231.8 |
| 5,656,394 A | | 8/1997 | Koksbang et al. |
| 5,698,341 A | * | 12/1997 | Tamaki et al. .......... 423/275 X |
| 5,753,387 A | | 5/1998 | Takami et al. |
| 5,919,589 A | * | 7/1999 | Kawakami et al. ...... 429/231.8 |
| 6,030,726 A | * | 2/2000 | Takeuchi et al. ......... 429/231.8 |
| 6,143,448 A | * | 11/2000 | Fauteux et al. .......... 429/231.8 |
| 6,190,634 B1 | * | 2/2001 | Lieber et al. ........... 423/414 X |
| 6,231,829 B1 | * | 5/2001 | Lee et al. ............... 423/445 R |
| 6,337,159 B1 | * | 1/2002 | Peled et al. ......... 429/231.8 X |

FOREIGN PATENT DOCUMENTS

| | | |
|---|---|---|
| EP | 0 713 256 | 5/1996 |
| JP | 7-122274 | 5/1995 |
| JP | 7-235293 | 9/1995 |
| JP | 7-288123 | 10/1995 |
| JP | 9-213335 | 8/1997 |
| WO | WO 99/49532 | 9/1999 |

OTHER PUBLICATIONS

O. Mao, et al., Journal of the Electrochemical Society, vol. 146, No. 2, pp. 405–413, "Mechanically Alloyed Sn–Fe(–C) Powders as Anode Materials for Li–Ion Batteries," 1999.

* cited by examiner

*Primary Examiner*—Stephan Kalafut
(74) *Attorney, Agent, or Firm*—Oblon, Spivak, McClelland, Maier & Neustadt, P.C.

(57) ABSTRACT

The present invention provides a nonaqueous electrolyte secondary battery, comprising a nonaqueous electrolyte, a positive electrode, and a negative electrode containing a negative electrode active material, wherein the negative electrode active material contains a composite material having a microstructure containing a carbon-containing phase and a crystal phase having an average size falling within a range of between 0.01 $\mu$m and 10 $\mu$m.

22 Claims, 4 Drawing Sheets

NONAQUEOUS ELECTROLYTE SECONDARY BATTERY

CROSS-REFERENCE TO RELATED APPLICATIONS

This application is based upon and claims the benefit of priority from the prior Japanese Patent Applications No. 11-225489, filed Aug. 9, 1999; and No. 11-374989, filed Dec. 28, 1999, the entire contents of which are incorporated herein by reference.

BACKGROUND OF THE INVENTION

The present invention relates to a nonaqueous electrolyte secondary battery, particularly, to a nonaqueous electrolyte secondary battery with an improved negative electrode active material.

A nonaqueous electrolyte secondary battery using a lithium metal, a lithium alloy, a lithium compound or a carbonaceous material as a negative electrode active material is expected to provide a battery having a high energy density, and vigorous researches are being made on such a nonaqueous electrolyte secondary battery.

Among the various nonaqueous electrolyte secondary batteries noted above, a lithium ion battery comprising a positive electrode containing $LiCoO_2$ or $LiMn_2O_4$ as a positive electrode active material and a negative electrode containing a carbonaceous material capable of absorbing-desorbing lithium is widely put to practical use because the negative electrode is unlikely to be finely pulverized and it is possible to obtain a long life and a high safety.

On the other hand, a secondary battery comprising a negative electrode consisting of lithium metal, which is expected to have a high capacity, has not yet been put to practical use. It should be noted in this connection that, if lithium metal is used as the negative electrode, the negative electrode is deteriorated by the reaction between the nonaqueous electrolyte and lithium metal. Also, a lithium dendrite is generated by the repetition of the charge-discharge operations so as to cause lithium to drop from the negative electrode and, thus, to bring about an internal short circuiting. As a result, the cycle life is shortened.

In order to overcome the above-noted problems inherent in the secondary battery using a negative electrode made of lithium metal, vigorous researches are being made on the use of a lithium alloy or a lithium compound for forming the negative electrode. However, in the secondary battery comprising a negative electrode containing a lithium alloy such as lithium-aluminum alloy, it is certainly possible to suppress the reaction between the nonaqueous electrolyte and the negative electrode so as to improve the charge-discharge efficiency. However, if a deep charge-discharge is repeated, the negative electrode is finely pulverized, resulting in failure to obtain a long life. On the other hand, the discharge capacity is very small in the secondary battery comprising a negative electrode containing a lithium compound such as $Li_{4/3}Ti_{5/3}O_4$.

It is also proposed to use a chalcogen compound such as an oxide or a nitride as the negative electrode active material in an attempt to further increase the capacity of the negative electrode. For example, a secondary battery comprising a negative electrode containing SnO or $SnO_2$ as the negative electrode active material is disclosed in Japanese Patent Disclosure (Kokai) No. 7-122274 and Japanese Patent Disclosure No. 7-235293. On the other hand, a secondary battery comprising a negative electrode containing an amorphous oxide such as $SnSiO_3$ or $SnSi_{1-x}P_xO_3$ is disclosed in Japanese Patent Disclosure No. 7-288123. However, these secondary batteries are not sufficiently satisfactory in capacity and cycle life.

Also, a negative electrode containing an intermetallic compound such as $Sn_2Fe$ or $Sn_2FeC_{0.3}$ to 1.2 is disclosed on pages 405 to 427 of "J. Electrochem. Soc., Vol. 146, No. 2, 1999". It is taught that the cycle life characteristics can be improved in the presence of a mixed phase having a stoichiometric composition and consisting of $Sn_2Fe$ as a Li absorbing phase and $SnFe_3C$ as a phase that does not absorb Li. However, the discharge capacity is about 200 mAh/g, which is smaller than that of a carbonaceous material.

On the other hand, a lithium secondary battery comprising a negative electrode containing a carbonaceous material having a high crystallinity and containing at least one element M selected from the group consisting of Mg, Al, Si, Ca, Sn and Pb is disclosed in Japanese Patent Disclosure No. 9-213335 and U.S. Pat. No. 5,753,387, said carbonaceous material having a peak corresponding to the case where the interplanar spacing $d_{002}$ derived from (002) reflection is 0.34 nm or less in the powder X-ray diffraction. It is taught that graphite crystallite having a sufficiently developed graphite structure is contained in the carbonaceous material. According to these documents, it is desirable for the content of the element M in the carbonaceous material to fall within a range of between 0.1 and 10 atomic %. It is described that, if the content of the element M exceeds 10 atomic %, a metal carbide is formed in an unduly large amount, resulting in failure to obtain a long life.

BRIEF SUMMARY OF THE INVENTION

An object of the present invention is to provide a nonaqueous electrolyte secondary battery having a high capacity and a long life.

According to a first aspect of the present invention, there is provided a nonaqueous electrolyte secondary battery, comprising a nonaqueous electrolyte, a positive electrode, a negative electrode containing a negative electrode active material, wherein the negative electrode active material contains a composite material having a microstructure containing a phase containing carbon and a crystal phase having an average size falling within a range of between 0.01 μm and 10 μm.

According to a second aspect of the present invention, there is provided a nonaqueous electrolyte secondary battery, comprising a nonaqueous electrolyte, a positive electrode, a negative electrode containing a negative electrode active material, wherein the negative electrode active material contains a composite material having a microstructure containing a carbon-containing phase having an interplanar spacing $d_{002}$ derived from (002) reflection of more than 0.34 nm and a crystal phase having an average size falling within a range of between 0.01 μm and 10 μm.

According to a third aspect of the present invention, there is provided a nonaqueous electrolyte secondary battery, comprising a nonaqueous electrolyte, a positive electrode, a negative electrode containing a negative electrode active material containing a composite material of the composition represented by formula (1);

$$M1_xM2_yC_{1-x-y} \tag{1}$$

where M1 is at least one element selected from the group consisting of Si, Ge, Sn, Pb, B, Al, Ga, In, Sb and Zn, M2 is at least one element having an electronegativity larger than that of Li and excluding M1 and Fe, and the atomic ratios x and y are:

0.01≦x≦0.7 and 0<y<0.3.

According to a fourth aspect of the present invention, there is provided a nonaqueous electrolyte secondary battery, comprising a nonaqueous electrolyte, a positive electrode, a negative electrode containing a negative electrode active material, wherein the negative electrode active material contains a composite material having a composition represented by formula (1) and the composite material has a microstructure containing a carbon-containing phase and a crystal phase having an average size falling within a range of between 0.01 μm and 10 μm;

$$M1_xM2_yC_{1-x-y} \tag{1}$$

where M1 is at least one element selected from the group consisting of Si, Ge, Sn, Pb, B, Al, Ga, In, Sb and Zn, M2 is at least one element having an electronegativity larger than that of Li and excluding M1 and Fe, and the atomic ratios x and y are:

0.01≦x≦0.7 and 0<y<0.3.

According to a fifth aspect of the present invention, there is provided a nonaqueous electrolyte secondary battery, comprising a nonaqueous electrolyte, a positive electrode, a negative electrode containing a negative electrode active material, wherein the negative electrode active material contains a composite material having a composition represented by formula (1) and the composite material has a microstructure containing a carbon-containing phase having an interplanar spacing $d_{002}$ derived from (002) reflection of more than 0.34 nm and a crystal phase having an average size falling within a range of between 0.01 μm and 10 μm;

$$M1_xM2_yC_{1-x-y} \tag{1}$$

where M1 is at least one element selected from the group consisting of Si, Ge, Sn, Pb, B, Al, Ga, In, Sb and Zn, M2 is at least one element having an electronegativity larger than that of Li and excluding M1 and Fe, and the atomic ratios x and y are:

0.01≦x≦0.7 and 0 <y<0.3.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
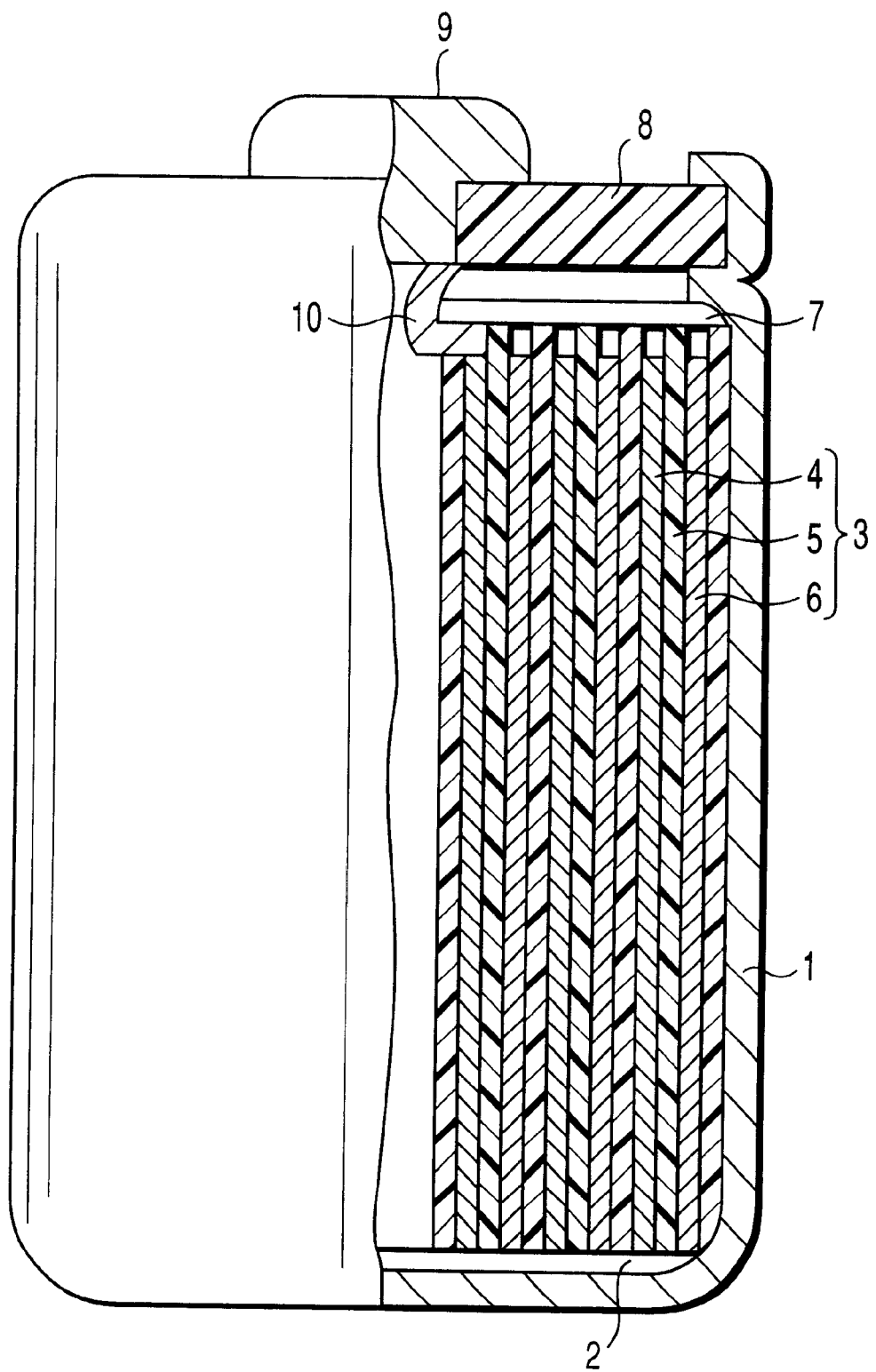
FIG. 1 is a partial cross sectional view showing a cylindrical nonaqueous electrolyte secondary battery exemplifying a nonaqueous electrolyte secondary battery of the present invention.

The first nonaqueous electrolyte secondary battery of the present invention comprises a nonaqueous electrolyte, a positive electrode, a negative electrode containing a negative electrode active material having a composite material of the composition represented by formula (1);

$$M1_xM2_yC_{1-x-y} \tag{1}$$

where M1 is at least one element selected from the group consisting of Si, Ge, Sn, Pb, B, Al, Ga, In, Sb and Zn, M2 is at least one element having an electronegativity larger than that of Li and excluding M1 and Fe, and the atomic ratios x and y are:

0.01≦x≦0.7 and 0<y<0.3.

The positive electrode, the negative electrode and the nonaqueous electrolyte included in the secondary battery of the present invention will now be described.

1) Negative Electrode

The composition of formula (1) will now be described. Specifically, M1 is capable of absorbing and desorbing an alkali metal such as lithium. Particularly, it is desirable for M1 to consist of at least one element selected from the group consisting of Sb, Si, Sn, B, Al and Zn. M1 consisting of the particular element permits markedly increasing the discharge capacity of the secondary battery. Particularly, it is desirable for M1 to contain Si and Al because the particular M1 makes it possible to increase the discharge potential of the secondary battery. It is also desirable for M1 to contain Si and Sn because the particular M1 makes it possible to increase the capacity and cycle life of the secondary battery.

In the present invention, the molar ratio x of M1 is set to fall within a range of between 0.01 and 0.7. If the molar ratio x is smaller than 0.01, it is difficult to convert the carbon-containing phase into a microcrystalline state and an amorphous state. Also, the amount of absorption-desorption of the alkali metal achieved by the negative electrode active material is lowered. It follows that the discharge capacity and the cycle life of the secondary battery are lowered. If the molar ratio x of M1 is increased, the discharge capacity is increased. However, the cycle life is lowered. If the molar ratio x of M1 exceeds 0.7, the cycle life of the secondary battery is markedly lowered. The molar ratio x should preferably fall within a range of between 0.05 and 0.7, more preferably between 0.1 and 0.7, more preferably between 0.1 and 0.65, and most preferably between 0.2 and 0.6. If the molar ratio x falls within a range of between 0.2 and 0.6, the discharge capacity can be markedly increased.

M2 in formula (1) serves to promote conversion of the carbon-containing phase into a microcrystalline state or an amorphous state. Particularly, it is desirable for M2 to consist of at least one element selected from the group consisting of rare earth elements (which include Y), Mg, Ca, Sr, Ba, Ti, Zr, V, Nb, Ta, Cr, Mo and W. M2 consisting of the particular element permits improving the discharge capacity and the cycle life of the secondary battery. It is more desirable for M2 to consist of at least one element selected from the group consisting of Mg, Ca, Ti, Zr, Nb and Cr.

The molar ratio y of M2 should fall within a range of between a value larger than 0 and another value smaller than 0.3. If M2 is not contained at all in the composite material, it is difficult to convert the carbon-containing phase into a microcrystalline state and an amorphous state, leading to reduction in the discharge capacity and the cycle life of the secondary battery. If the molar ratio y is increased, the cycle life can be increased. However, the discharge capacity is lowered. If the molar ratio y is 0.3 or more, the reduction in the discharge capacity is rendered prominent. The molar ratio y should fall preferably within a range of between 0.01 and 0.25, more preferably between 0.05 and 0.2. If the molar ratio y falls within a range of between 0.05 and 0.2, the cycle life characteristics can be markedly improved.

Among the composite materials described above, it is desirable for the composite material to contain M1 consisting of Si and M2 consisting of Mg or Sn, or to contain at least one of Si and Sn, B and Mg because the particular composite material permits increasing the discharge capacity of the secondary battery.

It is desirable for the microstructure of the composite material to have at least one of conditions (1) to (4) given below:

Microstructure (1):

It is desirable for the microstructure of the composite material to have a microcrystalline phase or an amorphous phase. The negative electrode containing a composite material having such a microstructure as an active material makes it possible to increase the capacity and the cycle life characteristics of the secondary battery.

Microstructure (2):

It is desirable for the composite material to have a half width $\Delta(2\theta)$ of at least one of the three highest peaks falling within a range of between 0.2° and 50° in an X-ray diffraction using CuKα as the X-ray source. If the half width $\Delta(2\theta)$ is smaller than 0.2°, the crystallinity of the composite material is increased and, thus, the absorption rate is lowered, making it difficult to obtain a secondary battery having a large discharge capacity and a long cycle life. On the other hand, if the half width $\Delta(2\theta)$ exceeds 50°, the crystallinity is remarkably lowered and, thus, the absorption amount is decreased. As a result, both the battery capacity and the cycle life are lowered. The half width $\Delta(2\theta)$ should preferably fall within a range of between 0.4° and 40°, more preferably between 20° and 30°.

Incidentally, the three highest peaks denotes the three peaks obtained by the X-ray diffraction and having the highest, the second highest and the third highest intensities. Since these three highest peaks are inherent in M1 or M2 contained in the composite material, the peak positions are changed depending on the kind of M1 or M2.

Microstructure (3):

It is desirable for the microstructure of the composite material to consist essentially of a carbon-containing phase and a crystal phase having an average size falling within a range of between 0.01 μm and 10 μm and containing M1 and M2. Further, in a more preferred microstructure, the crystal phase should be dispersed in the base phase consisting of the carbon-containing phase.

It is possible for the carbon-containing phase to consist of carbon atoms alone. However, it is possible for the carbon-containing phase to contain other elements as far as the characteristics of the negative electrode active material are not impaired. To be more specific, it is possible for the carbon-containing phase to contain the elements or atoms constituting the crystal phase.

It is desirable for the carbon-containing phase to consist of at least one phase selected from the group consisting of a polycrystalline carbon-containing phase lacking in the long-range order, a microcrystalline carbon-containing phase, and an amorphous carbon-containing phase.

The lack in the long-range order denotes the state that the order of crystals is disturbed and the atoms fail to form a regular crystal lattice and that, although the short-range order is retained, the long-range order is lost among the orders owned by the crystal.

It is possible for the crystal phase to consist of a crystal grain (a fine crystal grain), a nano-crystal (a crystal of ultra fine grain size), or a cluster. Also, it is possible for a plurality of different crystal phases such as a crystal grain and a nano-crystal to be present in the composite material.

The crystal phase can be observed by photographing the transmission electron micrograph image with a magnification of 10,000 to 500,000.

In the present invention, the average size of the crystal phase is defined to fall within a range of between 0.01 μm and 10 μm as described previously. If the average size of the crystal phase is smaller than 0.01 μm, the crystal texture of the entire composite material is made to have a microcrystalline state, an amorphous state or a polycrystalline state lacking in the long-range order. As a result, the absorption amount is lowered, leading to failure to obtain a high capacity under a high rate discharge. On the other hand, where the average size of the crystal phase exceeds 10 μm, the composite material tends to be finely pulverized because the carbon-containing phase and the crystal phase are poor in affinity, resulting in failure to obtain a long cycle life. Preferably, the average size of the crystal phase should fall within a range of between 0.03 μm and 8 μm, more preferably between 0.05 μm and 5 μm, and most preferably between 0.1 μm and 1 μm. Where the average size of the crystal phase falls within a range of between 0.05 μm and 5 μm, most preferably between 0.1 μm and 1 μm, it is possible to markedly improve the high rate discharge characteristics of the negative electrode and the cycle life of the secondary battery, making it possible to obtain a nonaqueous electrolyte secondary battery excellent in the discharge capacity and the cycle characteristics. It should be noted that the size of the crystal phase is changed depending on the affinity between the element constituting the crystal phase and carbon. Specifically, the size of the crystal phase is diminished with increase in affinity between the element constituting the crystal phase and carbon.

Microstructure (4):

It is desirable for the microstructure of the composite material to consist essentially of a carbon-containing phase having an interplanar spacing $d_{002}$ derived from (002) reflection of more than 0.34 nm and a crystal phase having an average size of 0.01 μm to 10 μm and containing the elements M1 and M2. More preferably, the carbon-containing phase should be dispersed in the crystal phase in the microstructure.

If the interplanar spacing of the carbon-containing phase is 0.34 nm or less, the crystallinity of the carbon-containing phase is increased so as to make it difficult to obtain a large capacity in the high rate discharge. The microstructure of the carbon-containing phase can be made adapted for the absorption and desorption of the alkali metal such as lithium by setting the interplanar spacing of the carbon-containing phase at more than 0.34 nm. Preferably, the interplanar spacing should be 0.345 nm or more, more preferably 0.35 nm or more. Further, it is desirable to set the upper limit of the interplanar spacing at 0.5 nm.

It is possible for the carbon-containing phase to consist of carbon atoms alone. However, it is acceptable for the carbon-containing phase to contain other elements as far as the characteristics of the negative electrode active material are not impaired. To be more specific, it is possible for the carbon-containing phase to contain the elements or atoms constituting the crystal phase in addition to carbon.

It is possible for the crystal phase to consist of a crystal grain (a fine crystal grain), a nano-crystal (a crystal of ultra fine grain size), or a cluster. Also, it is possible for a plurality of different crystal phases such as a crystal grain and a nano-crystal to be present in the composite material.

The crystal phase can be observed by photographing the transmission electron micrograph image with a magnification of 10,000 to 500,000.

The average size of the crystal phase is defined to fall within the range described previously for the reason described previously in conjunction with "Microstructure (3)". Preferably, the average size of the crystal phase should fall within a range of between 0.03 $\mu$m and 8 $\mu$m, more preferably between 0.05 $\mu$m and 5 $\mu$m, and most preferably between 0.1 $\mu$m and 1 $\mu$m.

The composition of the carbon-containing phase and the composition of the crystal phase containing the elements M1 and M2 can be analyzed by an X-ray microanalyser (EPMA), an energy dispersive X-ray spectroscopy (EDX) or an Auger electron spectroscopy (AES).

The charge-discharge efficiency of the negative electrode active material can be markedly improved by allowing in advance the negative electrode to contain lithium. The lithium content of the negative electrode active material should desirably fall within a range of between 0.05% by weight and 50% by weight, more preferably between 0.1% by weight and 40% by weight, and most preferably between 1% by weight and 30% by weight, based on the amount of the negative electrode active material.

The composite material can be prepared by, for example, a high frequency melting method, an arc melting method, a sintering method, an ultra rapid solidification process, an atomizing method, a sputtering method, a mechanical processing method, a rolling method, or a sol-gel method. Particularly, it is desirable for the composite material to be prepared by a mechanical processing method, an ultra rapid solidification process, or a sintering method.

The mechanical processing method, the ultra rapid solidification process and the sintering method will now be described.

1) Mechanical processing method:

The mechanical processing can be performed by mechanically mixing predetermined amounts of, for example, a carbon powder and powders of the elements M1 and M2. Also, in addition to the method of using a carbon powder and metal powders of the elements M1 and M2 as the starting materials, it is also effective to use an intermetallic compound and a carbon compound as the starting materials.

The specific method of the mechanical processing includes a method of supplying the starting materials into a vessel containing balls such as a planetary ball mill, a screw ball mill, a rotary ball mill or Attoritor (trade name of Union Process company) such that a mechanical impact produced by the collision of the balls is given to the starting materials. Particularly, it is desirable to use a planetary ball mill.

Where the vessel is tightly closed, it is desirable to carry out the mechanical processing by disposing the vessel within an apparatus like a dry box filled with an inert gas atmosphere such as an argon gas, or to carry out the mechanical processing by mounting an exhaust valve to the vessel and by exhausting the vessel to set up a vacuum state within the vessel. Further, it is possible to carry out the mechanical processing by introducing a nitrogen gas into the vessel. Also, it is desirable to take suitable measures such that a double wall structure is employed for the lid of the vessel so as to enhance the hermetic properties of the vessel, or the vessel is disposed under the inert gas atmosphere or under vacuum. Concerning the purity of the inert gas atmosphere, it is desirable for the oxygen content to be not higher than 100 ppm and for the water content to be not higher than 50 ppm. It is desirable to handle the starting material powders under an inert gas atmosphere so as to avoid oxidation of the powders.

It is desirable for the mechanical processing using, for example, a planetary ball mill to be carried out for 1 to 100 hours. If the processing time is shorter than 1 hour, it is difficult to improve the absorption characteristics of the composite material. On the other hand, if the processing time exceeds 100 hours, oxidation of the composite material proceeds gradually. Also, a manufacturing cost tends to be high.

It is desirable for the particle diameter of the composite material powder obtained by the mechanical processing to fall within a range of between 0.1 $\mu$m and 50 $\mu$m.

It is desirable to apply a heat treatment to the composite material obtained by the mechanical processing because the heat treatment permits improving the cycle life of the secondary battery. The optimum temperature for the heat treatment, which is changed depending on the composition of the composite material, should desirably fall within a range of between 100° C. and 500° C. On the other hand, the optimum time for the heat treatment, which is changed depending on the temperature for the heat treatment, should desirably fall within a range of between 0.1 and 500 hours, more preferably between 0.5 and 100 hours, and most preferably between 1 and 50 hours.

It is desirable for an aggregate formed by the element species to be present in the powder of the composite material obtained by the mechanical processing. The presence of the aggregate permits improving the absorption characteristics. It is desirable for the aggregate to be present in an amount of at least 5% by weight based on the amount of the composite material powder.

It is possible for the composite material to contain N, O, F, etc. as impurities as far as the characteristics of the secondary battery are not impaired. It is desirable for each of these impurities to be contained in an amount not larger than 1% by weight.

2) Ultra rapid solidification process:

In the ultra rapid solidification process, predetermined amounts of carbon and the elements M1 and M2 are mixed, followed by obtaining a rapidly solidified powder by using an ultra rapid solidification apparatus. It is desirable to employ a single roll method or a double roll method for the rapid solidification process. Also, the rotation speed of the roll should desirably fall within a range of between 5 and 50 m/s.

3) Sintering method:

In the sintering method, a carbon powder and powders of the elements M1 and M2 are mixed at a predetermined mixing ratio, followed by molding the resultant mixture under pressure. Then, a heat treatment is applied to the resultant molding under an inert gas atmosphere or under vacuum so as to obtain a desired composite material. It is desirable to apply an additional heat treatment to the resultant composite material.

The negative electrode can be prepared by suspending the negative electrode active material described previously, a conductive agent and a binder in a suitable solvent, followed by coating a metal foil such as a copper foil with the resultant suspension. Then, the metal foil coated with the suspension is dried and pressed so as to prepare the desired negative electrode.

The conductive agent used in the present invention includes, for example, acetylene black, carbon black and graphite.

The binder used in the present invention includes, for example, polytetrafluoroethylene (PTFE), polyvinylidene fluoride (PVdF), a fluorine rubber, ethylene-butadiene rubber (SBR), and carboxymethyl cellulose (CMC).

It is desirable to mix the negative electrode active material, the conducting agent and the binder in a mixing ratio of 70 to 95% by weight for the negative electrode active material, 0 to 25% by weight for the conductive agent, and 2 to 10% by weight for the binder.

2) Positive Electrode:

The positive electrode can be prepared by, for example, suspending a positive electrode active material, a conductive agent and a binder in a suitable solvent, followed by coating a current collector such as an aluminum foil with the suspension. Then, the coated current collector is dried and pressed so as to obtain a desired positive electrode.

Various oxides and sulfides can be used as the positive electrode active material. The specific positive electrode active material includes, for example, manganese dioxide ($MnO_2$), lithium manganese complex oxide, e.g., $LiMn_2O_4$ or $LiMnO_2$, lithium nickel complex oxide, e.g., $LiNiO_2$, lithium cobalt complex oxide, e.g., $LiCoO_2$, lithium nickel cobalt complex oxide, e.g., $LiNi_{1-x}Co_xO_2$, lithium manganese cobalt complex oxide, e.g., $LiMn_xCo_{1-x}O_2$, and vanadium oxide, e.g., $V_2O_5$. It is also possible to use an organic material such as a conductive polymer or a disulfide series polymer as the positive electrode active material. The positive electrode active materials that are used more preferably in the present invention include, for example, lithium manganese complex oxide ($LiMn_2O_4$), lithium nickel complex oxide ($LiNiO_2$), lithium cobalt complex oxide ($LiCoO_2$), lithium nickel cobalt complex oxide ($LiNi_{0.8}Co_{0.2}O_2$) and lithium manganese cobalt complex oxide ($LiMn_xCo_{1-x}O_2$) because these complex oxides permit increasing the battery voltage.

The conductive agent used in the present invention includes, for example, acetylene black, carbon black and graphite.

The binder used in the present invention includes, for example, polytetrafluoroethylene (PTFE), polyvinylidene fluoride (PVdF) and fluorine-based rubber.

It is desirable to mix the positive electrode active material, the conducting agent and the binder in a mixing ratio of 80 to 95% by weight for the positive electrode active material, 3 to 20% by weight for the conductive agent, and 2 to 7% by weight for the binder.

3) Nonaqueous Electrolyte:

The nonaqueous electrolyte used in the present invention includes a liquid nonaqueous electrolyte prepared by dissolving a solute in a nonaqueous solvent, a gel nonaqueous electrolyte prepared by adding the nonaqueous solvent and the solute to a polymer, a solid electrolyte prepared by adding the solute to a polymer, and an inorganic solid electrolyte having a lithium ion conductivity.

The liquid nonaqueous electrolyte is prepared by dissolving a solute in a nonaqueous solvent that can be used in a lithium battery. It is desirable to use as the liquid nonaqueous solvent a cyclic carbonate such as ethylene carbonate (EC) or propylene carbonate, and a mixed solvent consisting of, for example, the cyclic carbonate and a second solvent having a viscosity lower than that of the cyclic carbonate.

The second solvent used in the present invention includes, for example, a chain carbonate such as dimethyl carbonate, methyl ethyl carbonate or diethyl carbonate, γ-butyrolactone, acetonitrile, methyl propionate, ethyl propionate, a cyclic ether such as tetrahydrofuran or 2-methyl tetrahydrofuran, and a chain ether such as dimethoxy ethane or diethoxy ethane.

The alkali salts, particularly lithium salt, can be used as the solute in the present invention. The lithium salt used in the present invention includes, for example, lithium hexafluoro phosphate ($LiPF_6$), lithium tetrafluoro borate ($LiBF_4$), lithium arsenic hexafluoride ($LiAsF_6$), lithium perchlorate ($LiClO_4$), and lithium trifluoro metasulfonate ($LiCF_3SO_3$). Particularly, it is desirable to use lithium hexafluoro phosphate ($LiPF_6$) and lithium tetrafluoro borate ($LiBF_4$) as the electrolyte. It is desirable to dissolve 0.5 to 2 mol/L(liter) of the solute in the nonaqueous solvent.

The gel nonaqueous electrolyte is prepared by dissolving the nonaqueous solvent described above and the solute noted above in a polymer. The polymer used in the present invention includes, for example, polyacrylonitrile, polyacrylate, polyvinylidene fluoride (PVdF), polyethylene oxide (PEO) and a copolymer containing acrylonitrile, acrylate, vinylidene fluoride or ethylene oxide as a monomer unit.

The solid electrolyte can be obtained by dissolving the solute in the polymer, followed by solidifying the resultant solution. The polymer used in the present invention includes, for example, polyacrylonitrile, polyvinylidene fluoride (PVdF), polyethylene oxide (PEO) and a copolymer containing acrylonitrile, vinylidene fluoride or ethylene oxide as a monomer unit. On the other hand, the inorganic solid electrolyte used in the present invention includes, for example, a ceramic material containing lithium. Particularly, it is desirable to use $Li_3N$, $Li_3PO_4$-$Li_2S$-$SiS_2$ glass as the inorganic solid electrolyte.

Where a liquid nonaqueous electrolyte or a gel nonaqueous electrolyte is used as the nonaqueous electrolyte, it is possible arrange a separator between the positive electrode and the negative electrode. The separator used in the present invention includes, for example, a synthetic resin unwoven fabric, a polyethylene porous film, and a polypropylene porous film.

The first nonaqueous electrolyte secondary battery of the present invention described above comprises a positive electrode, a negative electrode having a negative electrode active material containing a composite material having the composition represented by formula (1) described previously, and a nonaqueous electrolyte. The negative electrode active material used in the present invention is capable of absorbing and desorbing a large amount of an alkali metal such as Li, has a high reversibility of the absorption and desorption reaction, and is capable of avoiding the pulverization accompanying the progress of the charge-discharge cycles. It follows that the secondary battery provided with the negative electrode having the particular negative electrode active material permits increasing the discharge capacity, compared with the secondary battery comprising the negative electrode having a carbonaceous material as the negative electrode active material, and is advantageous in the cycle life over the secondary battery comprising the negative electrode containing lithium metal, a lithium alloy or a lithium compound as the negative electrode active material.

Where at least one of the microcrystalline phase and the amorphous phase is present in the microstructure of the composite material, it is possible to increase the amount of absorption and desorption of the alkali metal and to suppress the change in volume in the step of absorbing the alkali metal, making it possible to suppress the pulverization of the composite material. As a result, it is possible to improve both the discharge capacity and the cycle life of the secondary battery.

It should be noted that the crystallinity of the negative electrode active material can be suppressed to an appropriately low level by allowing the half-width $\Delta(2\theta)$ of at least one of the three highest peaks of the composite material in the x-ray diffraction using CuK$\alpha$ as an X-ray source to fall within a range of between 0.2° and 50°, making it possible to improve both the discharge capacity and the cycle life of the secondary battery.

It is desirable for the microstructure of the composite material to contain a crystal phase having an average size falling within a range of between 0.01 μm and 10 μm and at least one phase selected from the group consisting of a polycrystalline phase lacking in the long-range order, a microcrystalline phase and an amorphous phase. In this case, it is possible to further increase the amount of the absorption-desorption of the alkali metal. It is also possible to suppress the change in the volume in absorbing the alkali metal so as to suppress progress in the pulverization of the composite material. As a result, it is possible to improve both the cycle life and the discharge capacity at a high rate of the secondary battery.

It is also desirable for the microstructure of the negative electrode active material to contain a carbon-containing phase having an interplanar spacing $d_{002}$ derived from (002) reflection of more than 0.34 nm and a crystal phase having an average size falling within a range of between 0.01 μm and 10 μm. In this case, it is possible to further increase the absorption-desorption amount of the alkali metal such as lithium. It is also possible to further suppress the change in volume in the step of absorbing the alkali metal so as to suppress the progress of pulverization of the composite material. As a result, it is possible to improve both the cycle life and the discharge capacity at a high rate of the secondary battery.

In the secondary battery of the present invention, the crystal phase consists of a crystal grain, a nano-crystal or a cluster, with the result that it is possible to further improve the charge-discharge cycle life.

The second nonaqueous electrolyte secondary battery of the present invention comprises a positive electrode, a negative electrode containing a negative electrode active material capable of absorbing and desorbing an alkali metal, and a nonaqueous electrolyte.

The negative electrode active material used in the present invention is a composite material containing a carbon-containing phase and a crystal phase consisting essentially of an element capable of absorbing and desorbing an alkali metal and the crystal phase having an average size falling within a range of between 0.01 μm and 10 μm. In the composite material, it is desirable for the crystal phase to be dispersed in the carbon-containing phase.

In the present invention, it is possible to use the positive electrode and the nonaqueous electrolyte similar to those described previously in conjunction with the first nonaqueous electrolyte secondary battery. Also, where the liquid nonaqueous electrolyte or the gel nonaqueous electrolyte is used as the nonaqueous electrolyte, it is possible to arrange a separator between the positive electrode and the negative electrode. It is possible to use the separator similar to that described previously in conjunction with the first nonaqueous electrolyte secondary battery.

The negative electrode will now be described.

The carbon-containing phase used in the present invention is capable of absorbing and desorbing an alkali metal such as lithium. It is possible for the carbon-containing phase to consist of carbon atoms alone. However, it is acceptable for the carbon-containing phase to contain other elements as far as the characteristics of the negative electrode active material are not impaired. To be more specific, it is possible for the carbon-containing phase to contain elements or atoms constituting the crystal phase.

It is desirable for the carbon-containing phase to satisfy at least one of requirements (1) and (2) given below:

(1) It is desirable for the carbon-containing phase to be a phase selected from the group consisting of a polycrystalline carbon-containing phase lacking in the long-range order, a microcrystalline carbon-containing phase and an amorphous carbon-containing phase.

(2) It is desirable for the carbon-containing phase to have an interplanar spacing $d_{002}$ derived from (002) reflection of more than 0.34 nm. If the interplanar spacing of the carbon-containing phase is not more than 0.34 nm, the crystallinity of the carbon-containing phase tends to be increased, resulting in failure to obtain a large capacity at a high rate discharge. If the interplanar spacing is more than 0.34 nm, the microstructure of the carbon-containing phase can be made adapted for the absorption and desorption of the alkali metal such as lithium. Preferably, the interplanar spacing should be 0.345 nm or more, more preferably 0.35 nm or more. On the other hand, it is desirable for the upper limit of the interplanar spacing to be 0.5 nm.

The crystal phase can be formed of a crystal grain (a fine crystal grain), a nano-crystal (a crystal of very fine grain size), or a cluster. It is possible for a plurality of different kinds of crystal phases to be present in the composite material.

The crystal phase can be observed by photographing a transmission electron micrograph image having a magnification of 10,000 to 500,000.

As described previously, the average size of the crystal phase is defined in the present invention to fall within a range of between 0.01 μm and 10 μm. If the average size of the crystal phase is lower than 0.01 μm, the crystal texture of the entire composite material is made to have a microcrystalline state, an amorphous state, or a polycrystalline state lacking in the long-range order. As a result, the absorption amount is lowered, leading to failure to obtain a large capacity under a high rate discharge. On the other hand, where the average size of the crystal phase exceeds 10 μm, the carbon-containing phase and the crystal phase are poor in affinity. As a result, the composite material tends to be finely pulverized, leading to failure to obtain a long cycle life. The average size of the crystal phase should preferably fall within a range of between 0.03 μm and 8 μm, more preferably between 0.05 μm and 5 μm, and most preferably between 0.1 μm and 1 μm. Where the average size of the crystal phase falls within a range of between 0.05 μm and 5 μm, most preferably between 0.1 μm and 1 μm, the high rate discharge characteristics of the negative electrode and the cycle life of the secondary battery can be markedly improved, making it possible to obtain a nonaqueous electrolyte secondary battery excellent in the discharge capacity and the cycle characteristics.

In the present invention, it is desirable for the element capable of absorbing and desorbing an alkali metal, which constitutes the main component of the crystal phase, to contain at least one element selected from the group consisting of Mg, Si, Ge, Sn, Pb, B, Al, Ga, In, Zn and Sb. Particularly, the composite material having a crystal phase containing at least one element selected from the group consisting of Mg, Si, Sn, B, Al and Sb makes it possible to markedly improve the negative electrode characteristics.

It is desirable for the element capable of absorbing and desorbing an alkali metal, which constitutes the main component of the crystal phase, to consist of at least two elements selected from the group consisting of Mg, Si, Ge, Sn, Pb, B, Al, Ga, In, Zn, Sb and P or to consist of at least one element selected from the group consisting of Mg, Si, Ge, Sn, Pb, B, Al, Ga, In, Zn, Sb and P and at least one element having an electronegativity larger than that of Li and excluding Mg, Si, Ge, Sn, Pb, B, Al, Ga, In, Zn, Sb, P and Fe. Particularly, it is desirable for the elements capable of absorbing and desorbing an alkali metal to contain a combination of Mg and Si, a combination of Si and Sn, a combination of Si and B, a combination of Sn and Mg, a combination of Mg and Pd, a combination of Mg and Ca, a combination of Si and N, a combination of Sn and Ti, a combination of B and P, a combination of Si and S, and a combination of Sn and I.

It is desirable for at least one element having an electronegativity larger than that of lithium and excluding Mg, Si, Ge, Sn, Pb, B, Al, Ga, In, Zn, Sb, P and Fe to consist of at least one element selected from the group consisting of Ag, As, Au, Ba, Bi, Be, Ca, Cd, Hg, Ir, I, N, Ti, Zr, P, Pd, Pt, Rh, S, Se, Sr, Y, Te and Tl.

It is desirable for the volume ratio of the crystal phase to the volume of the carbon-containing phase to fall within a range of between 10% and 95%. In this case, the negative electrode characteristics can be sufficiently improved so as to obtain a secondary battery having a large discharge capacity. The volume ratio noted above should fall preferably within a range of between 14% and 93%, more preferably between 14% and 90%, more preferably between 30% and 90%, more preferably between 40% and 90%, more preferably between 40% and 85%, and most preferably between 40% and 70%. Where the volume ratio of the crystal phase to the volume of the carbon-containing phase falls within the ranges noted above, it is possible to further improve the high rate discharge capacity and the cycle life.

It is desirable for the composite material to have a half width $\Delta(2\theta)$ of at least one of the three highest peaks falling within a range of between 0.2° and 50° in the X-ray diffraction using CuK$\alpha$ as the X-ray source. If the half width $\Delta(2\theta)$ is less than 0.2°, the crystallinity of the composite material is increased so as to lower the absorption rate, with the result that it is difficult to obtain a secondary battery having a high discharge capacity and a long cycle life. On the other hand, if the half width $\Delta(2\theta)$ exceeds 50°, crystallinity is remarkably lowered so as to lower the absorption amount, with the result that both the battery capacity and the cycle life are lowered. Preferably, the half width $\Delta(2\theta)$ should fall within a range of between 0.4° and 40°, and more preferably between 2° and 30°.

Incidentally, in the composite material, the three highest peaks are the peaks inherent in the elements constituting the crystal phase of the composite material and, thus, the peak positions are changed depending on the kinds of the elements contained in the crystal phase.

The composition of the carbon-containing phase and the composition of the crystal phase can be analyzed by an X-ray microanalyser (EPMA), an energy dispersive X-ray spectroscopy (EDX) or an Auger electron spectroscopy (AES).

In the present invention, it is possible to markedly improve the charge-discharge efficiency of the negative electrode active material by allowing in advance the negative electrode to contain lithium. The lithium content of the negative electrode active material should desirable fall within a range of between 0.05% by weight and 50% by weight based on the amount of the negative electrode active material. Preferably, the lithium content noted above should fall within a range of between 0.1% by weight and 40% by weight, and more preferably between 1% by weight and 30% by weight.

The composite material can be prepared by a method similar to the method described previously in conjunction with the first nonaqueous electrolyte secondary battery.

The negative electrode can be prepared by suspending the negative electrode active material, a conducting agent and a binder in a suitable solvent, followed by coating a metal foil such as a copper foil with the resultant suspension. Then, the coated metal foil is dried and pressed so as to obtain a desired negative electrode.

It is possible to use the conducting agent and the binder similar to those described previously in conjunction with the first nonaqueous electrolyte secondary battery.

The second nonaqueous electrolyte secondary battery of the present invention described above comprises a positive electrode, a negative electrode containing a negative electrode active material, and a nonaqueous electrolyte. The negative electrode active material contains a composite material containing a carbon-containing phase, and a crystal phase containing as a main component an element capable of absorbing and desorbing an alkali metal and the crystal phase having an average size of 0.01 $\mu$m to 10 $\mu$m. The negative electrode material of the particular construction is capable of increasing the amount of absorption and desorption of the an alkali metal such as lithium and, at the same time, is capable of enhancing the reversibility of the absorption and desorption reaction. Also, since the composite material used in the present invention is capable of suppressing the change in volume in the step of absorbing the alkali metal, the stability of the microstructure is high, making it possible to suppress the pulverization of the composite material caused by the collapse of the microstructure. As a result, it is possible to obtain a nonaqueous electrolyte secondary battery having a high capacity in the high rate discharge and having a long cycle life.

In the present invention, the carbon-containing phase is formed of at least one phase selected from the group consisting of a polycrystalline carbon-containing phase lacking in the long-range order, a microcrystalline carbon-containing phase, and an amorphous carbon-containing phase, making it possible to further suppress the pulverization of the negative electrode active material accompanying the progress of the charge-discharge cycles.

Also, in the present invention, the interplanar spacing $d_{002}$ derived from (002) reflection of the carbon-containing phase is more than 0.34 nm, making it possible to further suppress the pulverization of the negative electrode active material accompanying the progress of the charge-discharge cycle.

Further, the crystal phase is formed of a crystal grain, a nano-crystal or a cluster, making it possible to further improve the charge-discharge cycle life.

What should also be noted is that at least one element selected from the group consisting of Mg, Si, Ge, Sn, Pb , B, Al, Ga, In, Zn and Sb is contained in the element constituting the crystal phase and capable of absorbing and desorbing an alkali metal, making it possible to further improve the cycle life and the discharge capacity at a high rate of the secondary battery.

Some Examples of the present invention will now be described with reference to FIGS. 1 to 4.

EXAMPLES 1 to 20

<Preparation of Positive Electrode>

A positive electrode having an electrode density of 3.0 g/cm$^3$ was prepared by mixing the starting materials consisting of 91% by weight of lithium cobalt oxide (LiCoO$_2$) used as a positive electrode active material, 2.5% by weight of acetylene black, 3% by weight of graphite, 4% by weight of polyvinylidene fluoride (PVdF), and an N-methyl pyrrolidone (NMP) solution, followed by coating an aluminum foil having a thickness of 15 μm, which was used as a current collector, with the resultant mixture, followed by drying and, then, pressing the coated aluminum foil.

<Preparation of Negative Electrode>

A carbon powder and powders of various elements were mixed to form a composition shown in Table 1, followed by applying a mechanical processing to the mixture for 50 hours by using a planetary ball mill that was rotated at 100 rpm so as to obtain a carbon composite material acting as a negative electrode active material.

Then, 5% by weight of graphite, 3% by weight of acetylene black, 7% by weight of PVdF and an NMP solution were added to 85% by weight of the resultant negative electrode active material so as to prepare a suspension. A current collector consisting of a copper foil having a thickness of 12 μm was coated with the resultant suspension. The coated current collector was dried and, then, pressed so as to obtain a negative electrode.

<Preparation of Electrode Group>

A laminate structure consisting of the positive electrode, a separator consisting of a polyethylene porous film, the negative electrode and the separator, which were laminated in the order mentioned, was spirally wound such that the negative electrode was positioned on the outermost circumferential surface, thereby obtaining an electrode group.

<Preparation of Liquid Nonaqueous Electrolyte>

A liquid nonaqueous electrolyte was prepared by dissolving 1.0 mol/L (liter) of lithium hexafluoro phosphate (LiPF$_6$) in a mixed solvent consisting of one part of ethylene carbonate (EC) and 2 parts of methyl ethyl carbonate (MEC).

The electrode group and the liquid electrolyte thus prepared were loaded in a stainless steel cylindrical case so as to assemble a cylindrical nonaqueous electrolyte secondary battery constructed as shown in FIG. 1.

To be more specific, an insulator 2 is arranged at the bottom portion of the cylindrical stainless steel case 1. The electrode group 3 is housed in the case 1. The electrode group 3 is constructed such that a band-like laminate structure consisting of the positive electrode 4, the separator 5, the negative electrode 6 and the separator 5 is spirally wound such that the separator 5 is positioned on the outermost circumferential surface.

The nonaqueous electrolyte is contained in the case 1. An insulating paper sheet 7 having an opening formed in the central portion is arranged above the electrode group 3 within the case 1. An insulating sealing plate 8 is arranged above an upper open portion of the case 1, and the region in the vicinity of the upper open portion is inwardly caulked so as to fix the sealing plate 8 to the case 1. A positive electrode terminal 9 is engaged with the center of the insulating sealing plate 8. A positive electrode lead wire 10 is connected at one end to the positive electrode 4 and is connected at the other end to the positive electrode terminal 9. On the other hand, the negative electrode 6 is connected via a negative electrode lead wire (not shown) to the case 1 acting as a negative electrode terminal.

Comparative Example 1

A nonaqueous electrolyte secondary battery was assembled as in Example 1, except that used as the negative electrode active material was a mesophase pitch based carbon fiber having a fiber diameter of 8 μm, an average fiber length of 20 μm, an interplanar spacing d$_{002}$ of 0.336 nm as measured by an X-ray diffraction using CuKα, and a specific surface area of 2 m$^2$/g as measured by the BET method, said mesophase pitch based carbon fiber being subjected in advance to a heat treatment at 3000° C.

COMPARATIVE EXAMPLE 2

A nonaqueous electrolyte secondary battery was assembled as in Example 1, except that used as the negative electrode active material was a Li-Al alloy powder.

COMPARATIVE EXAMPLE 3

A nonaqueous electrolyte secondary battery was assembled as in Example 1, except that used as the negative electrode active material was a SnO powder.

COMPARATIVE EXAMPLE 4

Carbonaceous particles containing 6% in atomic ratio of Si were prepared by steps of adding a fine powder of silicon carbide (SiC) to a mesophase pitch obtained from a petroleum pitch and uniformly dispersing the silicon carbide powder in the mesophase pitch, followed by spinning the dispersion, making the spun dispersion infusible, carbonizing the infusible material, pulverizing the carbonized material and, then, graphitizing the pulverized material under an inert atmosphere at 2600° C. under pressure. A nonaqueous electrolyte secondary battery was prepared as in Example 1, except that used was the carbonaceous particles thus obtained as the negative electrode active material.

Figure 2:
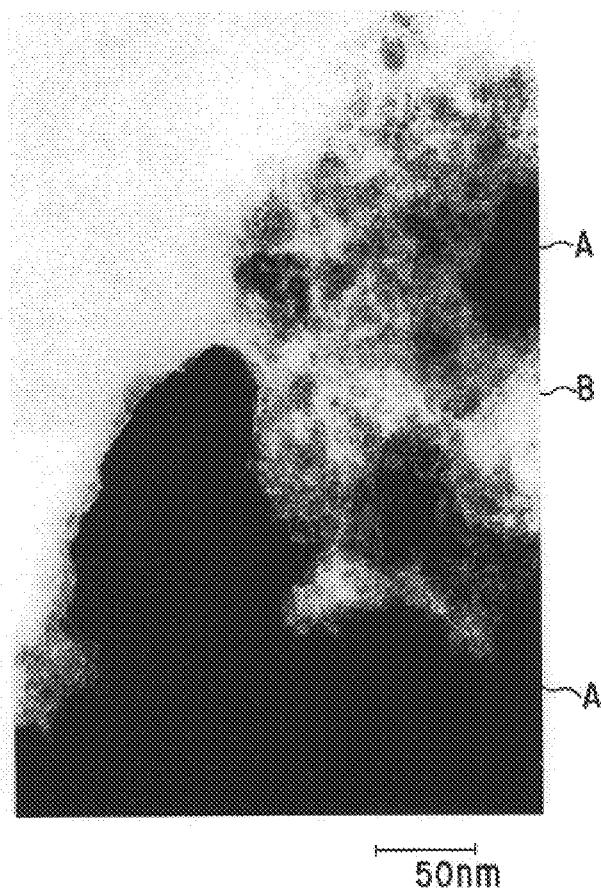
FIG. 2 is a transmission electron micrograph image showing a composite material constituting a negative electrode active material of a nonaqueous electrolyte secondary battery in Example 1.
Figure 3:
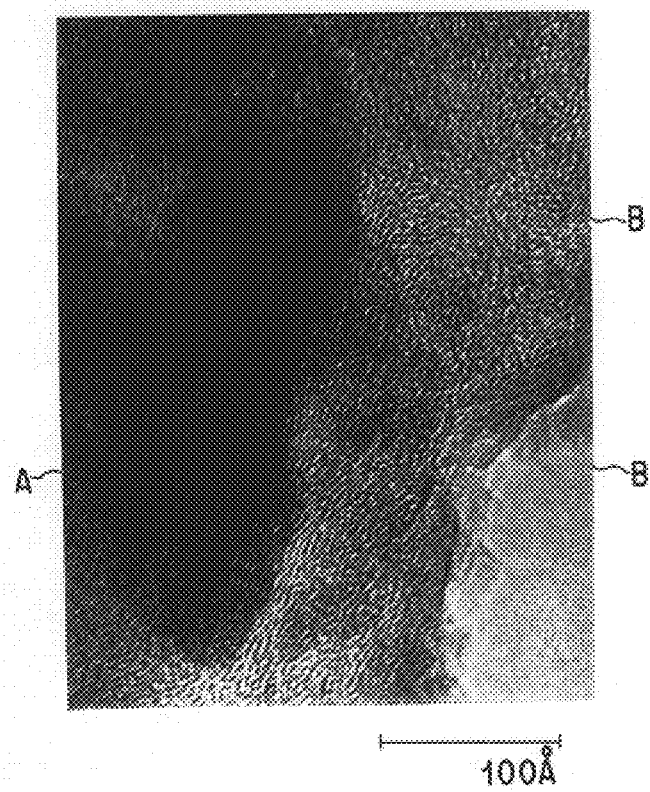
FIG. 3 is a transmission electron micrograph image showing a composite material constituting a negative electrode active material of a nonaqueous electrolyte secondary battery in Example 2.

Concerning the carbon composite material of the secondary battery for each of Examples 1 to 20, a transmission electron micrograph image sized 100 nm square was photographed at 20 points with a magnification of 400,000 by using a transmission electron microscope. Each of the carbon composite materials was found to have a microstructure in which crystal phases consisting of a crystal grain or a nano-crystal were dispersed in the carbon phase. FIGS. 2 and 3 are transmission electron micrograph images of the carbon composite material for Examples 1 and 2. FIG. 2 shows the region, where a crystal grain A consisting of Sn are dispersed in the carbon phase B, of the carbon composite material for Example 1. On the other hand, FIG. 3 shows the region, where a nano-crystal A consisting of Si are dispersed in the carbon phase B, of the carbon composite material for Example 2.

Figure 4:
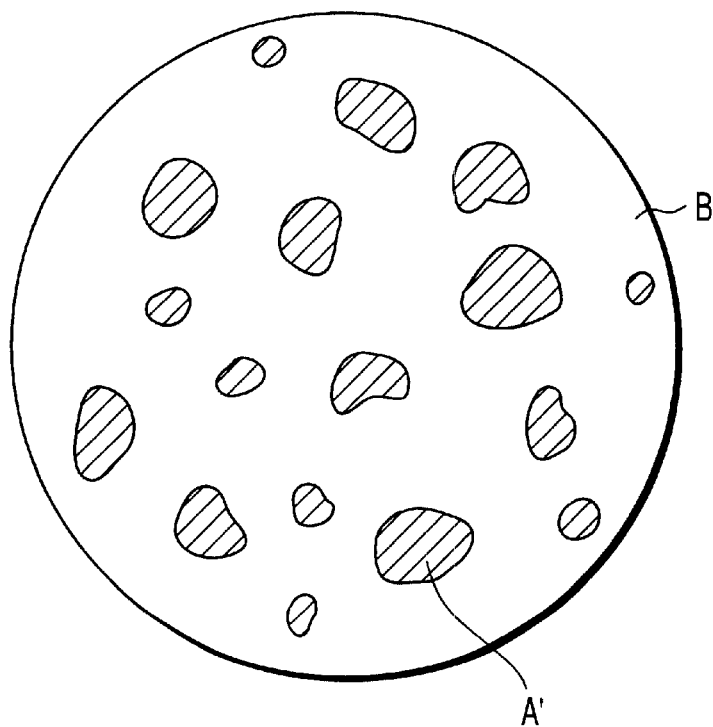
FIG. 4 is a diagram showing an entire image of the microstructure of a carbon composite material according to Example 1.

FIG. 4 is a diagram showing an entire image of the microstructure of a carbon composite material according to Example 1. As can be seen in FIG. 4, a crystal phase A' which contains at least one element selected from Sn and Mg is dispersed in a carbon phase B. There are various shapes of the crystal phase A', such as substantial spherical, substantially oval and ubstable shapes.

Figure 5:
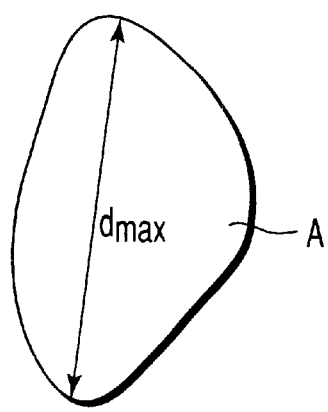
FIG. 5 is a diagram showing a size of the crystal phase.
Figure 6:
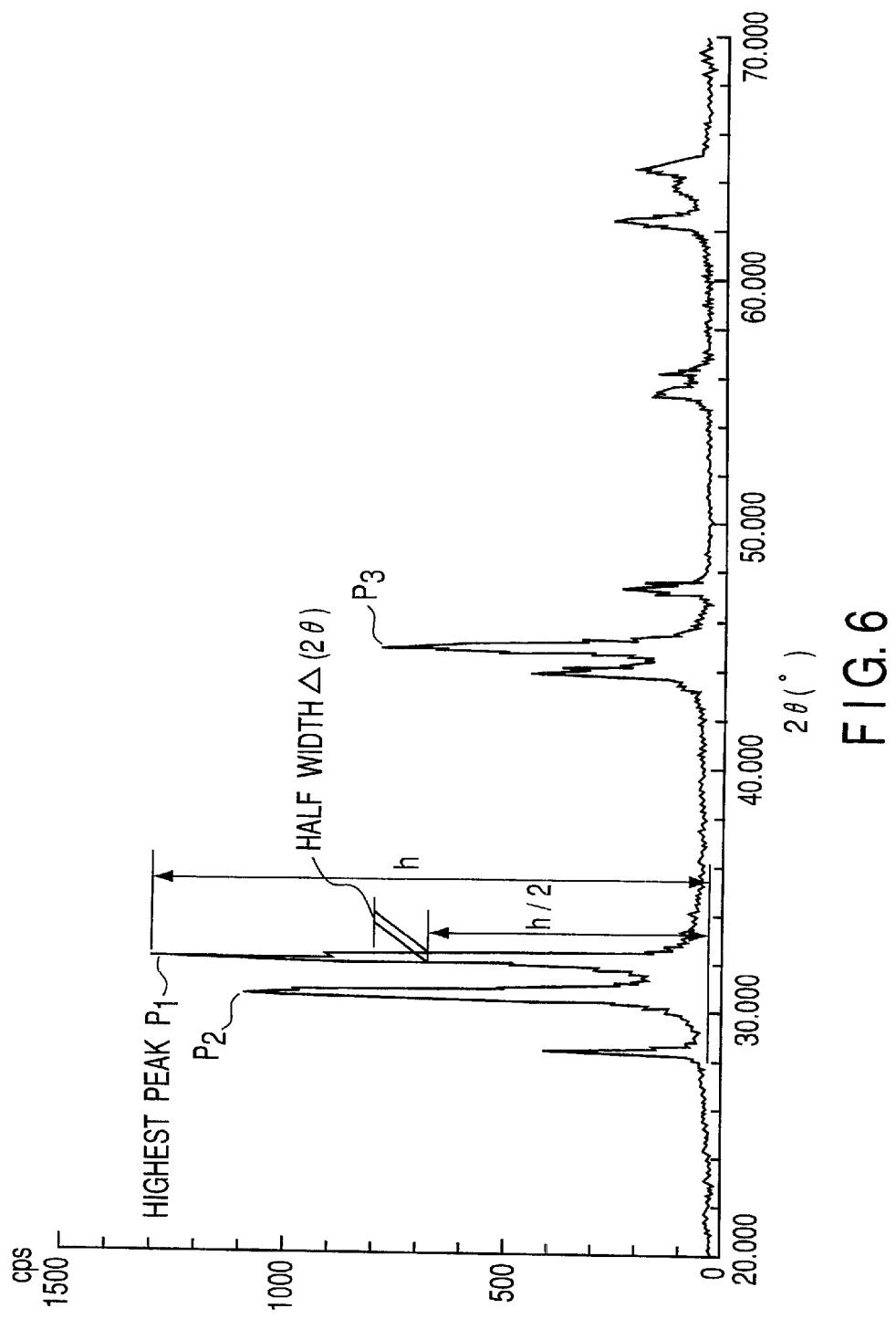
FIG. 6 shows the x-ray diffraction pattern of a composite material constituting a negative electrode active material of the nonaqueous electrolyte secondary battery in Example 21.

Concerning the carbon composite material of the secondary battery for each of Examples 1 to 20, a transmission electron micrograph image sized 100 nm square was photographed at 20 points with a magnification of 400,000 by using a transmission electron microscope. The size of the crystal phase of a transmission electron microscopic image at each of the 20 sections was measured, and the average of thus obtained measured values was calculated, which is presented in Table 1 below as the average size of the crystal phase. Here, the size of the crystal phase means the maximum measurement $d_{max}$ of the crystal phase A as shown in FIG. 5.

Further, concerning the carbon composite material for each of Examples 1 to 20 and the carbonaceous particle for Comparative Example 4, the interplanar spacing $d_{002}$ derived from (002) reflection of the carbon phase was measured by an X-ray diffraction using CuKα as the X-ray source. The measured values is also given in Table 1.

Also, concerning the carbon composite material of the secondary battery for each of Examples 1 to 20, the electron diffraction of the carbon phase was observed, with the result that the diffraction pattern exhibited halo. Therefore, it has been found that the microstructure of the carbon phase of the carbon composite material for each of Examples 1 to 20 consists of at least one of the microcrystalline phase and the amorphous phase.

Concerning the negative electrode active material for each of Examples 1 to 20 and Comparative Examples 1 to 5, an X-ray diffraction pattern was measured by using CuKα as an X-ray source so as to measure the half width Δ(2θ) of the three highest peaks. Table 1 also shows the largest half width Δ(2θ) of the three.

Further, a charge-discharge cycle test was applied to the secondary battery for each of Examples 1 to 20 and Comparative Examples 1 to 5, in which each secondary battery was charged to 4.2V for 2.5 hours with a charging current of 1A, followed by discharging the secondary battery to 2.7V with a discharge current of 1A, so as to measure the discharge capacity ratio and the capacity retention rate for each battery. Table 1 also shows the results. Incidentally, the discharge capacity ratio is a ratio with the discharge capacity of the secondary battery for Comparative Example 1 set at 1. Also, the discharge retention rate represents the discharge capacity at $300^{th}$ cycle, with the discharge capacity for the first cycle set at 100.

TABLE 1

| | | Composition | Discharge capacity | Capacity retention rate (%) ($300^{th}$ cycle) | Δ (2θ) (°) | Interplanar spacing $d_{002}$ (nm) | Size of crystal phase (μm) |
|---|---|---|---|---|---|---|---|
| Example | 1 | 0.25Sn—0.03Mg—0.72C | 1.5 | 85 | 0.25 | 0.36 | 8 |
| | 2 | 0.16Si—0.13Mg—0.71C | 1.7 | 88 | 0.3 | 0.37 | 5 |
| | 3 | 0.16Si—0.13Mg—0.71C | 1.8 | 89 | 12 | 0.38 | 0.015 |
| | 4 | 0.3Pb—0.1Mg—0.6C | 1.3 | 88 | 1.0 | 0.37 | 0.3 |
| | 5 | 0.2Ge—0.1Ca—0.8C | 1.4 | 86 | 2.0 | 0.37 | 0.4 |
| | 6 | 0.3Pb—0.1Sr—0.6C | 1.5 | 89 | 0.6 | 0.36 | 2 |
| | 7 | 0.45B—0.05Ba—0.5C | 1.4 | 90 | 0.8 | 0.36 | 1 |
| | 8 | 0.3Sn—0.1Al—0.1Mg—0.01Y—0.49C | 1.6 | 88 | 0.4 | 0.36 | 4 |
| | 9 | 0.45Ga—0.25La—0.3C | 1.5 | 91 | 15 | 0.40 | 0.016 |
| | 11 | 0.65In—0.15Ce—0.2C | 1.6 | 90 | 21 | 0.41 | 0.014 |
| | 12 | 0.7Zn—0.2Nd—0.1C | 1.5 | 86 | 0.6 | 0.36 | 3 |
| | 13 | 0.25Si—0.05Ti—0.7C | 1.9 | 94 | 10 | 0.40 | 0.02 |
| | 14 | 0.36Si—0.04Zr—0.6C | 1.8 | 88 | 8 | 0.37 | 0.05 |
| | 15 | 0.46Sn—0.04V—0.5C | 1.9 | 93 | 9 | 0.38 | 0.07 |
| | 16 | 0.4Sn—0.2Nb—0.4C | 1.9 | 92 | 27 | 0.42 | 0.018 |
| | 17 | 0.45Zn—0.25Ta—0.3C | 1.4 | 85 | 32 | 0.45 | 0.016 |
| | 18 | 0.26Si—0.04Cr—0.7C | 1.8 | 93 | 41 | 0.47 | 0.019 |
| | 19 | 0.38Ge—0.02Mo—0.6C | 1.7 | 88 | 18 | 0.41 | 0.02 |
| | 20 | 0.49Si—0.01W—0.5C | 1.5 | 87 | 5 | 0.38 | 0.18 |
| Comparative Example | 1 | C | 1 | 70 | 0.1 | 0.335 | 50 |
| | 2 | Lithium alloy (Li—Al) | 1.6 | 5 | 0.1 | — | 60 |
| | 3 | SnO | 1.5 | 10 | 0.1 | — | 30 |
| | 4 | C—Si | 1.3 | 85 | 0.1 | 0.335 | 20 |

As apparent from Table 1, the secondary battery in each of Examples 1 to 20 of the present invention is high in each of the discharge capacity and the capacity retention rate after 300 cycles. On the other hand, the secondary battery in Comparative Example 1, in which a carbonaceous material was used as the negative electrode active material, was found to be inferior to the secondary battery in each of Examples 1 to 20 in each of the discharge capacity and the capacity retention rate after 300 cycles. Also, the secondary battery in each of Comparative Examples 2 and 3, in which a lithium alloy or an oxide was used as the negative electrode active material, was found to be inferior to the secondary battery in each of Examples 1 to 20 in the capacity retention rate after 300 cycles. Further, the secondary battery in Comparative Example 4, in which the interplanar spacing $d_{002}$ is smaller than 0.34 nm and carbonaceous grains containing only Si was used as the negative electrode active material, was found to be inferior to the secondary battery in each of Examples 1 to 22 in the discharge capacity.

EXAMPLES 21 to 30

A carbon powder and powders of various elements were mixed to form compositions shown in Table 2, and a powder of a carbon composite material used as a negative electrode active material was prepared by applying a mechanical processing to the composition such that the composition was mixed for 150 hours by using a planetary ball mill that was kept rotated at 250 rpm.

Then, a nonaqueous electrolyte secondary battery was assembled as in Example 1 except the use of the particular negative electrode active material described above.

COMPARATIVE EXAMPLE 5

A carbon powder and a powder of $SiO_2$ having an average particle diameter of 20 µm were mixed, and a powder of a carbon composite material used as a negative electrode active material was prepared by applying a mechanical processing to the composition such that the composition was mixed for 150 hours by using a planetary ball mill that was kept rotated at 250 rpm.

Then, a nonaqueous electrolyte secondary battery was assembled as in Example 1 except the use of the particular negative electrode active material described above.

Concerning the carbon composite material of the secondary battery for each of Examples 21 to 30, a transmission electron micrograph image sized 100 nm square was photographed at 20 points by using a transmission electron microscope having a magnification of 400,000. It has been found that each of the carbon composite materials has a microstructure in which a crystal phase consisting of a crystal grain or a nano-crystal is dispersed in the carbon-containing phase.

Concerning the carbon composite material of the secondary battery for each of Examples 21 to 30, a transmission electron micrograph image sized 100 nm square was photographed at 20 points with a magnification of 400,000 by using a transmission electron microscope. The size of the crystal phase of a transmission electron microscopic image at each of the 20 sections was measured, and the average of thus obtained measured values was calculated, which is presented in Table 2 below as the average size of the crystal phase. Here, the size of the crystal phase means the maximum measurement $d_{max}$ of the crystal phase A as shown in FIG. 5.

Further, concerning the carbon composite material for each of Examples 21 to 30, the interplanar spacing $d_{002}$ derived from (002) reflection of the carbon-containing phase was measured by an X-ray diffraction using CuKα as the X-ray source. The measured values is also given in Table 2.

Also, concerning the carbon composite material of the secondary battery for each of Examples 21 to 30, the electron diffraction of the carbon-containing phase was observed, with the result that the diffraction pattern exhibited halo. Therefore, it has been found that the microstructure of the carbon-containing phase of the carbon composite material for each of Examples 21 to 30 consists of at least one of the microcrystalline phase and the amorphous phase.

Further, concerning the carbon composite material for each of Examples 21 to 30, the composition of each of the carbon-containing phase and the crystal phase was measured by using an Energy Dispersive X-ray Spectrometer of a transmission electron microscope and, at the same time, the volume ratios of the carbon-containing phase and the crystal phase were measured, with the results as shown in Table 2. The term "volume ratio" denotes B/A where A represents the volume of the carbon-containing phase, and B represents the volume of the crystal phase.

Concerning the negative electrode active material of the secondary battery for each of Examples 21 to 30 and Comparative Example 5, an X-ray diffraction pattern was measured by using CuKα as an X-ray source so as to measure the half width $\Delta(2\theta)$ of the three highest peaks. Table 2 shows the largest half width $\Delta(2\theta)$ of the three. Also, FIG. 4 shows the X-ray diffraction pattern for Example 21. As apparent from FIG. 5, the three highest peaks $P_1$, $P_2$ and $P_3$ appears at the peak positions inherent in Si. Also, the half width $\Delta(2\theta)$ of highest peak $P_1$ was 0.42°, the half width $\Delta(2\theta)$ of second peak $P_2$ was 0.45°, and the half width $\Delta(2\theta)$ of third peak $P_3$ was 0.50°.

Further, a charge-discharge cycle test was applied to the secondary battery for each of Examples 21 to 30 and Comparative Examples 1, 4 and 5, in which each secondary battery was charged to 4.2V for 2.5 hours with a charging current of 1A, followed by discharging the secondary battery to 2.5V with a discharge current of 3A, so as to measure the discharge capacity ratio and the capacity retention rate for each battery. Table 2 also shows the results. Incidentally, the discharge capacity ratio is a ratio with the discharge capacity of the secondary battery for Comparative Example 1 set at 1. Also, the discharge retention rate represents the discharge capacity at $200^{th}$ cycle, with the discharge capacity for the first cycle set at 100. Table 2 also shows the properties of the negative electrode active material of the secondary battery for Comparative Examples 1 and 4 referred previously.

TABLE 2

| | Charged composition | Composition of carbon-containing phase | Composition of crystal phase | High rate discharge capacity |
|---|---|---|---|---|
| Example 21 | 10C—0.25Sn—0.75Si | 10C | 0.25Sn—0.75Si | 2.5 |
| Example 22 | 5.0C—0.6Si—0.4Mg | 5.0C | 0.6Si—0.4Mg | 2.3 |
| Example 23 | 3.0C—0.95Si—0.05Al | 3.0C | 0.95Si—0.05Al | 1.6 |
| Example 24 | 0.95C—0.35Al—0.7Pb | 0.95C—0.05Al | 0.7Pb—0.3Al | 1.7 |
| Example 25 | 0.6C—1.2Si—0.2Ge | 0.6C—0.4Si | 0.2Ge—0.8Si | 1.9 |
| Example 26 | 0.75C—0.85In—0.4Zr | 0.75C—0.25In | 0.6In—0.4Zn | 1.8 |
| Example 27 | 0.9C—1.05B—0.05Sb | 0.9C—0.1B | 0.95B—0.05Sb | 2.1 |
| Example 28 | 0.7C—0.8Si—0.1Al—0.1Mg—0.1B—0.2Si | 0.7C—0.3Si | 0.5Si—0.1Al—0.1Mg—0.1B—0.2Si | 1.6 |
| Example 29 | 2.0C—0.85B—0.15Al | 2.0C | 0.85B—0.15Al | 1.5 |
| Example 30 | 1.0C—0.9Sn—0.1Mg | 1.0C | 0.90Sn—0.10Mg | 2.0 |
| Comparative Example 1 | C | C | — | 1.0 |
| Comparative Example 4 | C—Si | C | Si | 1.3 |
| Comparative Example 5 | C—$SiO_2$ | C | $SiO_2$ | 1.2 |

TABLE 2-continued

| | Capacity retention rate (200th cycle) (%) | Average size of crystal phase (μm) | Volume ratio (%) | Half width Δ (2θ) (°) | Interplanar spacing $d_{002}$ (nm) |
|---|---|---|---|---|---|
| Example 21 | 93 | 0.015 | 60 | 0.50 | 0.35 |
| Example 22 | 97 | 0.03 | 50 | 45 | 0.36 |
| Example 23 | 84 | 3 | 22 | 1 | 0.38 |
| Example 24 | 88 | 1.0 | 30 | 5 | 0.37 |
| Example 25 | 90 | 0.15 | 55 | 10 | 0.39 |
| Example 26 | 89 | 0.6 | 75 | 20 | 0.40 |
| Example 27 | 91 | 0.08 | 40 | 30 | 0.45 |
| Example 28 | 83 | 4 | 85 | 0.65 | 0.36 |
| Example 29 | 81 | 8 | 14 | 0.25 | 0.38 |
| Example 30 | 91 | 0.01 | 60 | 0.9 | 0.39 |
| Comparative Example 1 | 66 | 50 | — | 0.1 | 0.335 |
| Comparative Example 4 | 70 | 20 | 5 | 0.1 | 0.335 |
| Comparative Example 5 | 5 | 120 | 95 | 0.1 | 0.335 |

As apparent from Table 2, the secondary battery for each of Examples 21 to 30 of the present invention makes it possible to improve both the high rate discharge capacity and the capacity retention rate after 200 cycles.

On the other hand, the secondary battery for each of Comparative Examples 1 and 4 and the secondary battery for Comparative Example 5, in which a composite material of carbon and silicon dioxide was used as the negative electrode active material, were found to be inferior to the secondary battery for each of Examples 21 to 30 in each of the high rate discharge capacity and the capacity retention rate after 200 cycles.

Each of the Examples described above is directed to a cylindrical nonaqueous electrolyte secondary battery. However, the present invention is not limited to a cylindrical nonaqueous electrolyte secondary battery. For example, the technical idea of the present invention can also be applied to a rectangular, button-shaped or thin nonaqueous electrolyte secondary battery. Also, the electrode group housed in the case of the battery is not limited to a spirally wound electrode group. For example, it is also possible to use a electrode group prepared by laminating a plurality of rectangular positive electrodes, rectangular separators and rectangular negative electrodes in the order mentioned. Further, in the Examples described above, a metal can was used as a jacket. However, it is also possible to use a bag made of a laminate film as the jacket in the nonaqueous electrolyte secondary battery of the present invention.

As described above in detail, the present invention provides a nonaqueous electrolyte secondary battery with an improved discharge capacity and an improved cycle life.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte secondary battery, comprising a positive electrode, a nonaqueous electrolyte and a negative electrode containing a negative electrode active material,
wherein said negative electrode active material contains a composite material having a composition represented by formula (1) and said composite material has a microstructure containing a carbon-containing phase and a crystal phase an average size of said crystal phase falling within a range of between 0.01 μm and 10 μm;

$$M1_xM2_yC_{1-x-y} \quad (1)$$

where M1 is at least one element selected from the group consisting of Si, Ge, Sn, Pb, B, Al, Ga, In, Sb and Zn, M2 is at least one element having an electronegativity larger than that of Li and excluding M1 and Fe, and the atomic ratios x and y are: $0.01 \leq x \leq 0.7$ and $0 < y < 0.3$.

2. The nonaqueous electrolyte secondary battery according to claim 1, wherein said carbon-containing phase consists of at least one phase selected from the group consisting of a polycrystalline phase, a microcrystalline phase and an amorphous phase.

3. The nonaqueous electrolyte secondary battery according to claim 2, wherein said carbon-containing phase has an interplanar spacing $d_{002}$ derived from (002) reflection of more than 0.34 nm.

4. The nonaqueous electrolyte secondary battery according to claim 1, wherein said composite material has a half width Δ(2θ) of at least one of the three highest peaks falling within a range of between 0.2° and 50° in an X-ray diffraction using CuKα as an X-ray source.

5. The nonaqueous electrolyte secondary battery, comprising a positive electrode, a nonaqueous electrolyte and a negative electrode containing a negative electrode active material,
wherein said negative electrode active material contains a composite material having a composition represented by formula (1) and said composite material has a microstructure containing a carbon-containing phase having an interplanar spacing $d_{002}$ derived from (002) reflection of more than 0.34 nm and a crystal phase, an average size of said crystal phase falling within a range of between 0.1 μm and 10 μm;

$$M1_xM2_yC_{1-x-y} \quad (1)$$

where M1 is at least one element selected from the group consisting of Si, Ge, Sn, Pb, B, Al, Ga, In, Sb and Zn, M2 is at least one element having an electronegativity larger than that of Li and excluding M1 and Fe, and the atomic ratios x and y are: $0.01 \leq x \leq 0.7$ and $0 < y < 0.3$.

6. The nonaqueous electrolyte secondary battery according to claim 5, wherein said composite material has a half width $\Delta(2\theta)$ of at least one of the three highest peaks falling within a range of between 0.20° and 50° in an X-ray diffraction using CuK$\alpha$ as an X-ray source.

7. A nonaqueous electrolyte secondary battery, comprising a positive electrode, a nonaqueous electrolyte and a negative electrode containing a negative electrode active material, wherein said negative electrode active material contains a composite material having a microstructure containing a carbon-containing phase and a crystal phase, said crystal phase containing at least one element selected from the group consisting of Mg, Si, Ge, Sn, Pb, B, Al, Ga, In, Zn and Sb, and an average size of said crystal phase falling within a range of between 0.01 μm and 10 μm.

8. The nonaqueous electrolyte secondary battery according to claim 7, wherein said carbon-containing phase is at least one kind of phase selected from the group consisting of a polycrystalline phase, a microcrystalline phase, and an amorphous phase.

9. The nonaqueous electrolyte secondary battery according to claim 7, wherein said carbon-containing phase has an interplanar spacing $d_{002}$ derived from (002) reflection of more than 0.34 nm.

10. The nonaqueous electrolyte secondary battery according to claim 7, wherein said composite material has a half width $\Delta(2\theta)$ of at least one of the three highest peaks falling within a range of between 0.2° and 50° in an X-ray diffraction using CuK$\alpha$ as an X-ray source.

11. The nonaqueous electrolyte secondary battery according to claim 7, wherein said crystal phase consists of a crystal grain, a nano-crystal or a cluster.

12. The nonaqueous electrolyte secondary battery according to claim 7, wherein the average size of the crystal phase falls within a range of 0.03 μm to 8 μm.

13. The nonaqueous electrolyte secondary battery according to claim 7, wherein the average size of the crystal phase falls within a range of 0.05 μm to 5 μm.

14. The nonaqueous electrolyte secondary battery according to claim 7, wherein the average size of the crystal phase falls within a range of 0.1 μm to 1 μm.

15. A nonaqueous electrolyte secondary battery, comprising a positive electrode, a nonaqueous electrolyte and a negative electrode containing a negative electrode active material, wherein said negative electrode active material contains a composite material having a microstructure containing a carbon-containing phase having an interplanar spacing $d_{002}$ derived from (002) reflection of more than 0.34 nm and a crystal phase, said crystal phase containing at least one element selected from the group consisting of Mg, Si, Ge, Sn, Pb, B, Al, Ga, In, Zn and Sb, and an average size of said crystal phase falling within a range of between 0.01 μm and 10 μm.

16. The nonaqueous electrolyte secondary battery according to claim 15, wherein said composite material has a half width $\Delta(2\theta)$ of at least one of the three highest peaks falling within a range of between 0.2° and 50° in an X-ray diffraction using CuK$\alpha$ as an X-ray source.

17. The nonaqueous electrolyte secondary battery according to claim 15, wherein the interplanar spacing $d_{002}$ falls within a range from 0.34 nm to 0.5 nm.

18. A nonaqueous electrolyte secondary battery, comprising a positive electrode, a nonaqueous electrolyte and a negative electrode containing a negative electrode active material containing a composite material of the composition represented by formula (1);

$$M1_xM2_yC_{1-x-y} \tag{1}$$

where M1 is at least one element selected from the group consisting of Si, Ge, Sn, Pb, B, Al, Ga, In, Sb and Zn, M2 is at least one element having an electronegativity larger than that of Li and excluding M1 and Fe, and the atomic ratios x and y are: $0.01 \leq x \leq 0.7$ and $0 < y < 0.3$, wherein said composite material has a half width $\Delta(2\theta)$ of at least one of the three highest peaks falling within a range of between 0.2° and 50° in an X-ray diffraction using CuK$\alpha$ as an X-ray source.

19. The nonaqueous electrolyte secondary battery according to claim 18, wherein said atomic ratio x is: $0.1 \leq x \leq 0.7$.

20. The nonaqueous electrolyte secondary battery according to claim 18, wherein said M2 is at least one element selected from the group consisting of Mg, Ca, Sr, Ba, Ti, Zr, V, Nb, Ta, Cr, Mo and W.

21. The nonaqueous electrolyte secondary battery according to claim 18, wherein the microstructure of said composite material contains at least one phase selected from the group consisting of a microcrystalline phase and an amorphous phase.

22. The nonaqueous electrolyte secondary battery according to claim 18, wherein the half width $\Delta(2\theta)$ falls within a range from 2° to 30°.

* * * * *